US 6,618,651 B1

(12) United States Patent
Tan

(10) Patent No.: US 6,618,651 B1
(45) Date of Patent: Sep. 9, 2003

(54) ESTIMATING VEHICLE VELOCITIES USING LINEAR-PARAMETER-VARYING AND GAIN VARYING SCHEDULING THEORIES

(75) Inventor: Hualin Tan, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/082,379

(22) Filed: Feb. 25, 2002

(51) Int. Cl.[7] .................. B60G 17/15; G01M 15/00; B62D 6/00
(52) U.S. Cl. ................. 701/1; 701/70; 303/140
(58) Field of Search ................. 701/1, 70, 75, 701/41; 303/140, 146, 139, 147; 180/197, 199; 280/5.507, 5.51

(56) References Cited

U.S. PATENT DOCUMENTS

| | | | |
|---|---|---|---|
| 5,311,431 A | 5/1994 | Cao et al. | 364/424.05 |
| 5,608,631 A * | 3/1997 | Tsutsumi et al. | 364/426.018 |
| 5,742,918 A | 4/1998 | Ashrafi et al. | 701/70 |
| 5,742,919 A | 4/1998 | Ashrafi et al. | 701/70 |
| 5,747,682 A | 5/1998 | Hirano | 73/118.1 |
| 5,809,434 A | 9/1998 | Ashrafi et al. | 701/1 |
| 5,878,357 A * | 3/1999 | Sivashankar et al. | 701/1 |
| 6,161,905 A * | 12/2000 | Hac et al. | 303/146 |
| 6,185,485 B1 * | 2/2001 | Ashrafi et al. | 701/1 |
| 6,366,833 B1 * | 4/2002 | Fukuyama | 701/1 |
| 6,442,469 B1 * | 8/2002 | Matsuno | 701/70 |

* cited by examiner

Primary Examiner—Tan Q. Nguyen
Assistant Examiner—Dalena Tran
(74) Attorney, Agent, or Firm—John E. Kajander

(57) ABSTRACT

A system and a method for dynamically estimating the vehicle longitudinal and lateral velocities based on information gathered from four sensors measuring the longitudinal acceleration, lateral acceleration, wheel speed and yaw rate. The present invention provides a linear-parameter-varying state observer in conjunction with a gain scheduled state observer to provide good estimation of the vehicle motion in linear and non-linear ranges. The present invention is not dependent on variations in vehicle parameters, requires low computing power, and achieves improved estimation by adjusting the observer gains according to the changing yaw rate.

7 Claims, 1 Drawing Sheet

ESTIMATING VEHICLE VELOCITIES USING LINEAR-PARAMETER-VARYING AND GAIN VARYING SCHEDULING THEORIES

TECHNICAL FIELD

The present invention relates generally to estimating longitudinal and lateral velocities of a motor vehicle and more particularly to dynamically estimating longitudinal and lateral velocities.

BACKGROUND OF THE INVENTION

In recent years, there has been a tremendous increase in interest in advanced safety features in motor vehicles. This has led to the development of advanced vehicle chassis control systems, such as anti-lock brakes (ABS), traction control (TC), four-wheel steering (4WS), electronic stability program (ESP) to name but a few. To control a motor vehicle's motion it is necessary for the control system to know the vehicle's dynamic status, in terms of longitudinal velocity and acceleration, lateral velocity and acceleration, yaw rate, wheel speeds, and other parameters.

Information of all the dynamic signals can be obtained from sensor measurements. However, for an accurate estimate of the vehicle's parameters, the number of sensors needed is quite large and the sensors are expensive. A large number of expensive sensors add unwanted cost and weight to the motor vehicle. The sensors also occupy valuable packaging space on the vehicle.

Various algorithms have been proposed for estimating the vehicle dynamics. A typical method uses linear techniques, such as Kalman filtering. However, this approach has limited success because of the inherent non-linearity of vehicle dynamics. Other estimation methods depend heavily on the accuracy of a model for tire dynamics as well as information from a road/tire friction coefficient. The computing power required in such detailed models easily exceeds the computing power available in a normal vehicle engine control unit (ECU).

There is a need for a robust velocity estimation method having relatively low computing power requirements and at the same time providing accurate vehicle dynamic estimations.

SUMMARY OF THE INVENTION

The present invention is a system and method for dynamically estimating the longitudinal and lateral velocities of a motor vehicle. It presents a robust velocity estimation method having low computing power requirements and therefore fits well within the technological and financial constraints for developing vehicle control systems. The present invention accesses the information of vehicle dynamic signals using a minimum number of low-cost, off-the-shelf sensors that measure longitudinal acceleration, lateral acceleration, wheel speed and yaw rate. The present invention provides a gain scheduled linear-parameter-varying (LPV) state observer for vehicle longitudinal and lateral velocities based on information gathered from just a few sensors.

It is an object of the present invention to model a vehicle's dynamic behavior. It is another object of the present invention to estimate longitudinal and lateral velocities in linear and non-linear ranges of a vehicle's motion.

It is a further object of the present invention to accurately model the vehicle's dynamic behavior using low computing power from the vehicle's microprocessor. It is still a further object of the present invention to provide a robust model of the vehicle's dynamics that is independent of other vehicle parameters such as vehicle mass, center of gravity, moment of inertia and tire cornering stiffness.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
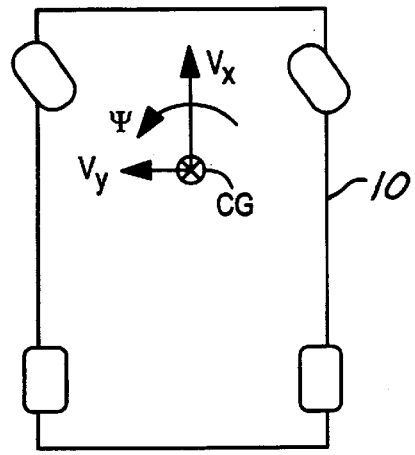
FIG. 1 is a schematic illustration of a vehicle showing the vehicle coordinate system associated with the method and system of the present invention.

Referring to FIG. 1, a coordinate system used as a reference for the present invention is shown. A vehicle 10 has a center of gravity, CG, about which the yaw rate, <, is referenced as well as the lateral velocity, $V_x$, and the longitudinal velocity, $V_y$.

Figure 2:
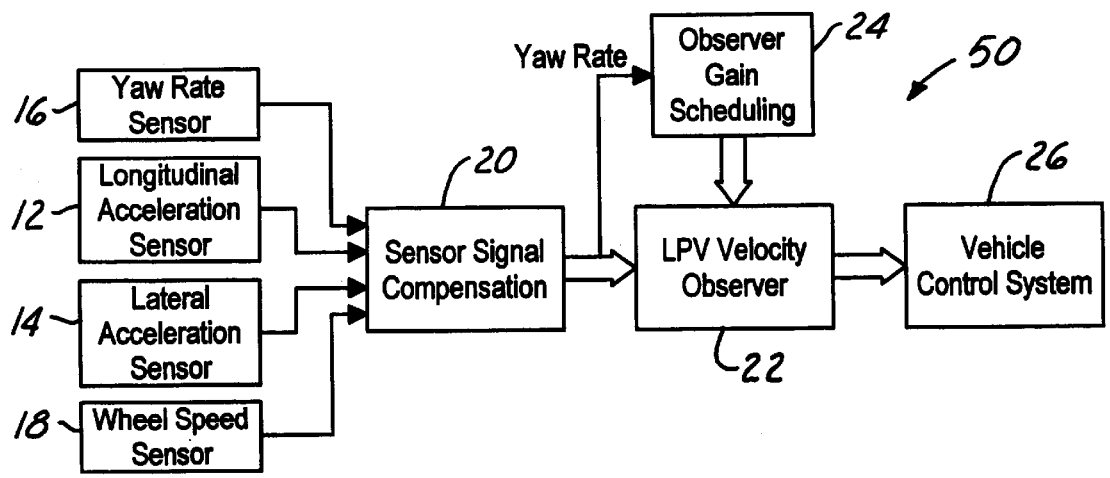
FIG. 2 is a block diagram of the system of the present invention.

Referring now to FIG. 2 a block diagram of the system 50 of the present invention is shown. Sensors 12, 14, 16 and 18 measuring longitudinal acceleration, $A_x$, lateral acceleration, $A_y$, yaw rate, <, and wheel speed are found on the vehicle (not shown). The signals from the sensors 12, 14, 16, and 18 under go signal processing 20 techniques. One skilled in the art is capable of normal processing of sensor information, which typically includes noise filtering and offset compensation. Several examples of signal processing can be found in U.S. Pat. Nos. 5,742,918 and 5,809,434. It is desirable for the present invention to use accurate signal information from the sensors in order to estimate accurate velocities.

The compensated signals are sent to the Linear-Parameter-Varying (LPV) state observer 22 of the present invention. The processed yaw rate, $\Psi$, is sent independently to a gain scheduler 24, which is also fed into the LPV 22. Finally, the estimated vehicle velocities from the LPV 22 are fed into the vehicle control system 26 and used for controlling systems such as traction control, electronic stability program, or any other system in the vehicle that is used to improve the performance, handling, and safety of the vehicle.

The LPV state observer 22 calculates a signal from the processed sensor signals that is used to estimate the lateral and longitudinal velocities of the vehicle. The LPV state observer 22 uses the following equation:

$$\begin{bmatrix} \dfrac{d\hat{V}_x}{dt} \\ \dfrac{d\hat{V}_y}{dt} \end{bmatrix} = \begin{bmatrix} 0 & \Psi \\ -\Psi & 0 \end{bmatrix} \begin{bmatrix} \hat{V}_x \\ \hat{V}_y \end{bmatrix} + \begin{bmatrix} L_1 \\ L_2 \end{bmatrix} \left( Y_m - \begin{bmatrix} 1 & 0 \end{bmatrix} \begin{bmatrix} \hat{V}_x \\ \hat{V}_y \end{bmatrix} \right) + \begin{bmatrix} 1 & 0 \\ 0 & 1 \end{bmatrix} \begin{bmatrix} A_x \\ A_y \end{bmatrix} \quad 1$$

$V'_x$ and $V'_y$ are the estimations of the vehicle velocities $V_x$ and $V_y$ respectively. $L_1$ and $L_2$ are time-varying observer gains. The signal $Y_m$ is calculated from available information from the vehicle sensors and is used as a measurement of the longitudinal velocity.

The LPV state observer 22 has gains, $L_1$ and $L_2$. Determining $L_1$ and $L_2$ is a key for best estimation results, and one way to do this is to schedule $L_1$ and $L_2$ by the gain scheduler 24 according to the yaw rate $\Psi$ and other parameters in the following equations:

$$L_1 = 2\lambda \qquad \text{2 and 3}$$

$$L_2 = \frac{\lambda^2}{\Psi_L} - \Psi, \Psi_L = \begin{cases} \Psi, & \text{for } |\Psi| \geq \Psi_0 \\ \Psi_0 \text{sign}(\Psi) & \text{for } |\Psi| < \Psi_0 \end{cases}$$

is a positive constant related to the closed-loop observer pole location, $\Psi_o$ is a positive constant which serves a dual purpose of compensating sensor signal vibration and avoiding a zero yaw rate. One skilled in the art is capable of tuning these two parameters according to vehicle attributes, sensor specifications, and vehicle dynamic status in order to achieve the best estimation results.

Figure 3:
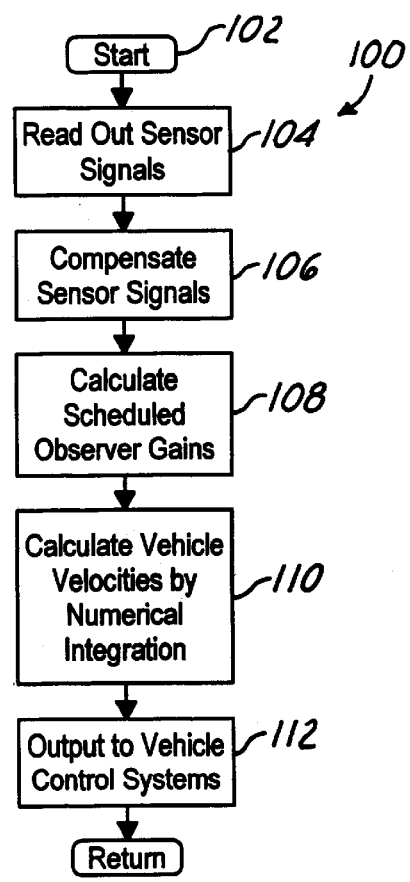
FIG. 3 is a flow chart of the method of the present invention.

Referring now to FIG. 3, the method 100 of the present invention begins 102 by reading 104 the signals from the sensors. The sensor signals are compensated 106 as is known in the art by signal processing techniques. Scheduled observer gains are calculated 108 using the yaw rate and other parameters as described in the formula above.

The vehicle velocity estimates are calculated 110 using the LPV state observer equations described above. The estimated values are fed 112 to the vehicle control systems, where they are used according to each systems need.

The present invention provides a system and a method for dynamically estimating the vehicle longitudinal and lateral velocities based on information gathered from four sensors measuring the longitudinal acceleration, lateral acceleration, wheel speed and yaw rate. The present invention provides a linear-parameter-varying state observer in conjunction with a gain scheduled state observer to provide good estimation of the vehicle motion in linear and non-linear ranges. The present invention is not dependent on variations in vehicle parameters, requires low computing power, and achieves improved estimation by adjusting the observer gains according to the changing yaw rate.

The invention covers all alternatives, modifications, and equivalents, as may be included within the spirit and scope of the appended claims.

What is claimed is:

1. A method for estimating longitudinal and lateral velocities in a motor vehicle comprising the steps of:

sensing lateral acceleration, Ax, on the motor vehicle;

sensing longitudinal acceleration Ay, on the motor vehicle;

sensing yaw rate, $\Psi$, on the motor vehicle; determining time-varying gains, L1 and L2, according to the sensed yaw rate and the following formulas;

$$L_1 = 2\lambda \qquad \text{2 and 3}$$

$$L_2 = \frac{\lambda^2}{\Psi_L} - \Psi, \Psi_L = \begin{cases} \Psi, & \text{for } |\Psi| \geq \Psi_0 \\ \Psi_0 \text{sign}(\Psi) & \text{for } |\Psi| < \Psi_0 \end{cases}$$

where $\lambda$ is a positive constant, $\Psi$o is a positive constant, and "sign" represents the sign of the way rate;

determining estimates of the lateral velocity, V'x and the longitudinal velocity V'y, in accordance with the following equation;

$$\begin{bmatrix} \frac{d\hat{V}_x}{dt} \\ \frac{d\hat{V}_y}{dt} \end{bmatrix} = \begin{bmatrix} 0 & \Psi \\ -\Psi & 0 \end{bmatrix} \begin{bmatrix} \hat{V}_x \\ \hat{V}_y \end{bmatrix} + \begin{bmatrix} L_1 \\ L_2 \end{bmatrix} \left( Y_m - \begin{bmatrix} 1 & 0 \end{bmatrix} \begin{bmatrix} \hat{V}_x \\ \hat{V}_y \end{bmatrix} \right) + \begin{bmatrix} 1 & 0 \\ 0 & 1 \end{bmatrix} \begin{bmatrix} A_x \\ A_y \end{bmatrix} \qquad 1$$

where Ym is a signal representing a measurement of the longitudinal wheel velocity.

2. The method as claimed in claim 1 wherein Ym is calculated from wheel velocity information sensed on the motor vehicle.

3. The method as claimed in claim 1 further comprising the step of tuning $\Psi$o and $\lambda$ according to attributes specific to the motor vehicle, specifications specific to sensors and a status of vehicle dynamics of the motor vehicle.

4. The method as claimed in claim 1 further comprising the steps of:

filtering noise from the sensed lateral acceleration, longitudinal acceleration and yaw rate; and offset compensating the sensed lateral acceleration, longitudinal acceleration and yaw rate.

5. A system for estimating vehicle lateral velocity and longitudinal velocity comprising:

a plurality of sensors attached to a vehicle for sensing predetermined vehicle parameters including lateral acceleration, Ax, longitudinal acceleration, Ay and yaw rate, $\Psi$;

a microcontroller in electrical communication with said plurality of sensors, said microcontroller being operative to:

determine time-varying gains, L1 and L2, according to the sensed yaw rate and the following formulas;

$$L_1 = 2\lambda \qquad \text{2 and 3}$$

$$L_2 = \frac{\lambda^2}{\Psi_L} - \Psi, \Psi_L = \begin{cases} \Psi, & \text{for } |\Psi| \geq \Psi_0 \\ \Psi_0 \text{sign}(\Psi) & \text{for } |\Psi| < \Psi_0 \end{cases}$$

where $\lambda$ is a positive constant, $\Psi$o is a positive constant, and "sign" represents the sign of the way rate; and determine estimates of the lateral velocity, V'x and the longitudinal velocity V'y, in accordance with the following equation;

$$\begin{bmatrix} \frac{d\hat{V}_x}{dt} \\ \frac{d\hat{V}_y}{dt} \end{bmatrix} = \begin{bmatrix} 0 & \Psi \\ -\Psi & 0 \end{bmatrix} \begin{bmatrix} \hat{V}_x \\ \hat{V}_y \end{bmatrix} + \begin{bmatrix} L_1 \\ L_2 \end{bmatrix} \left( Y_m - \begin{bmatrix} 1 & 0 \end{bmatrix} \begin{bmatrix} \hat{V}_x \\ \hat{V}_y \end{bmatrix} \right) + \begin{bmatrix} 1 & 0 \\ 0 & 1 \end{bmatrix} \begin{bmatrix} A_x \\ A_y \end{bmatrix} \qquad 1$$

where Ym is a signal representing a measurement of the longitudinal wheel velocity.

6. The system as claimed in claim 5 further comprising a signal processor for filtering noise and performing offset compensation of signals sensed by said plurality of sensors.

7. A method for estimating longitudinal and lateral velocities in a motor vehicle comprising the steps of:

sensing lateral acceleration, Ax, on the motor vehicle;

sensing longitudinal acceleration Ay, on the motor vehicle;

sensing yaw rate, $\Psi$, on the motor vehicle;

filtering noise from the sensed lateral acceleration, longitudinal acceleration and yaw rate; and offset compensating the sensed lateral acceleration, longitudinal acceleration and yaw rate;

determining time-varying gains, L1 and L2, according to the sensed yaw rate and the following formulas;

$$L_1 = 2\lambda$$

$$L_2 = \frac{\lambda^2}{\Psi_L} - \Psi, \Psi_L = \begin{cases} \Psi, & \text{for } |\Psi| \geq \Psi_0 \\ \Psi_0 \text{sign}(\Psi) & \text{for } |\Psi| < \Psi_0 \end{cases}$$

2 and 3 where $\lambda$ is a positive constant, $\Psi_0$ is a positive constant, and "sign" represents the sign of the way rate;

tuning $\Psi_0$ and $\lambda$ according to attributes specific to the motor vehicle, specifications specific to sensors and a status of vehicle dynamics of the motor vehicle;

determining estimates of the lateral velocity, V'x and the longitudinal velocity V'y, in accordance with the following equation;

$$\begin{bmatrix} \frac{d\hat{V}_x}{dt} \\ \frac{d\hat{V}_y}{dt} \end{bmatrix} = \begin{bmatrix} 0 & \Psi \\ -\Psi & 0 \end{bmatrix} \begin{bmatrix} \hat{V}_x \\ \hat{V}_y \end{bmatrix} + \begin{bmatrix} L_1 \\ L_2 \end{bmatrix} \left( Y_m - \begin{bmatrix} 1 & 0 \end{bmatrix} \begin{bmatrix} \hat{V}_x \\ \hat{V}_y \end{bmatrix} \right) + \begin{bmatrix} 1 & 0 \\ 0 & 1 \end{bmatrix} \begin{bmatrix} A_x \\ A_y \end{bmatrix}$$

1 where Ym is a signal representing a measurement of the longitudinal wheel velocity.

* * * * *